United States Patent [19]

Takase

[11] Patent Number: 5,640,602

[45] Date of Patent: Jun. 17, 1997

[54] TRANSFERRING DIGITAL DATA IN UNITS OF 2 BYTES TO INCREASE UTILIZATION OF A 2-BYTE-WIDE BUS

[75] Inventor: Hiroshi Takase, Kasugai, Japan

[73] Assignee: Fujitsu Limited, Kawasaki, Japan

[21] Appl. No.: 486,289

[22] Filed: Jun. 7, 1995

[30] Foreign Application Priority Data

Jun. 10, 1994 [JP] Japan .................... 6-129340

[51] Int. Cl.$^6$ ....................................... G06F 13/12
[52] U.S. Cl. ............... 395/855; 395/854; 395/850; 395/307; 395/843
[58] Field of Search ........................ 395/854, 850, 395/855, 886, 872, 874, 875, 877, 879, 880, 885, 888, 307, 842

[56] References Cited

U.S. PATENT DOCUMENTS

| | | | |
|---|---|---|---|
| 4,225,919 | 9/1980 | Kyu et al. | 395/306 |
| 5,185,694 | 2/1993 | Edenfield et al. | 395/287 |
| 5,394,528 | 2/1995 | Kobayashi et al. | 395/307 |
| 5,428,763 | 6/1995 | Lawler | 395/500 |
| 5,452,432 | 9/1995 | Macachor | 395/842 |
| 5,459,842 | 10/1995 | Begun et al. | 395/250 |
| 5,537,624 | 7/1996 | Whitesell | 395/872 |
| 5,550,972 | 8/1996 | Patrick et al. | 395/164 |
| 5,550,989 | 8/1996 | Santos | 395/306 |
| 5,559,969 | 9/1996 | Jennings | 395/307 |
| 5,564,026 | 10/1996 | Amini et al. | 395/308 |

*Primary Examiner*—Tod R. Swann
*Assistant Examiner*—Keith W. Saunders
*Attorney, Agent, or Firm*—Armstrong, Westerman Hattori, McLeland & Naughton

[57] ABSTRACT

A small computer system interface (SCSI) controller for continuously or intermittently performing communication of plural sets of data. The SCSI controller includes a data register for temporarily storing a set of data, a SCSI interface for transmitting the data stored in the data register in units of 2 bytes and for receiving data from another SCSI controller in units of 2 bytes, a byte counter for counting the number of bytes of data that is transmitted from or received by the SCSI interface, an internal processor for controlling initial setting of a target count value of the byte counter, and a transfer control circuit for controlling transmission of the data stored in the data register from the SCSI interface and reception of data by the data register via the SCSI interface. In data communication in units of 2 bytes, the SCSI controller can prevent transfer of dummy data that is ineffective, to thereby provide efficient data communication.

14 Claims, 9 Drawing Sheets

Fig. 2 (Prior Art)

| Upper 8 bits | B2 | B4 | X0 | | |
|---|---|---|---|---|---|
| Lower 8 bits | B1 | B3 | B5 | | |

Fig. 11A

| | Condition | | Reset | |
|---|---|---|---|---|
| | Number of bytes in one block | Flag | Control of byte number | Flag Control |
| M1 | Even | Even (0) | N | Even (0) |
| M2 | Even | Odd (1) | N | Odd (1) |
| M3 | Odd | Even (0) | N-1 | Odd (1) |
| M4 | Odd | Odd (1) | N+1 | Even (0) |

Fig. 11B

| | Condition | | Reset | |
|---|---|---|---|---|
| | Number of bytes in one block | Flag | Control of byte number | Flag Control |
| M5 | Even | Even (0) | N | Even (0) |
| M6 | Even | Odd (1) | N-1 | Odd (1) |
| M7 | Odd | Even (0) | N | Odd (1) |
| M8 | Odd | Odd (1) | N-1 | Even (0) |

TRANSFERRING DIGITAL DATA IN UNITS OF 2 BYTES TO INCREASE UTILIZATION OF A 2-BYTE-WIDE BUS

BACKGROUND OF THE INVENTION

1. Field of the Invention

The present invention relates to an apparatus and method for transferring digital data. More particularly, the invention relates to an apparatus and method of transferring of digital data in two byte units across a 16 bit data transfer bus connecting interface devices incorporated in data processor.

2. Description of the Related Art

Data processing devices such as personal computers and hard disk drives often incorporate small computer system interface (SCSI) controllers to manage the transfer of data during data processing operations. When two or more SCSI controllers are used in a digital processing device, data transfer occurs along SCSI buses, interconnecting the SCSI controllers. Data transferred across SCSI buses typically occurs a data sets divided into a plurality of data blocks. Each data block contains a predetermined number of bytes. Consequently, in designing a way to transfer data across SCSI buses, two key aspects of the design are the number of data blocks to be transferred across the bus at any given time, and the number of bytes contained in each data block. Generally speaking, the following four combinations of data blocks and bytes are possible for a single data set: combinations where the number of blocks is constant and the number of bytes is either even or odd, and combinations where the number of blocks is variable and the number of bytes is either even or odd.

FIG. 1 is a flowchart illustrating the operational routine of a conventional SCSI controller when it performs data transfer in units of 2 bytes using 16-bit bus lines. The first and second bytes of the transferred data are allocated to the lower and upper 8 bits of the 16-bit SCSI bus, respectively.

At step 101, the controller determines whether the number of bytes in a data block remaining to be transferred, ByN, is an even or odd number. If ByN is an even number, one block of data is transferred at step 119. Should this be the case, all of the 16 bits of the SCSI buses will contain data. Next, at step 120, the controller operates to subtract 1 from the number of blocks BLN remaining to be transferred. At step 121, the controller determines whether the result of the subtraction in Step 120 is zero. If the number of blocks to be transferred BLN is not zero, the controller repeats the operations at steps 119 to 121 until BLN reaches zero. When the number of BLN reaches zero, data transfer for one data set is considered complete.

Alternatively, if the controller determines at step 101 that the number of bytes ByN in a data block is not an even number, the data transfer routine advances to step 102. At step 102, the routine examines whether the number of blocks BLN remaining to be transferred is an odd number. If BLN is an even number, the controller advances execution of the data transfer routine to the procedure at step 112, where a byte counter is set to a first target value of ByN+1. At step 113, the number of bytes set for the first target value (ByN+1) is transferred as one block of data. The byte counter is then decremented. At step 114, the block number BLN is reduced by one.

At step 115, the byte counter is initially set to a second target value of ByN−1. Following this, at step 116, ByN−1 bytes of data are transferred as one block of data in the same manner as described at step 113. At step 117, the BLN number is decremented by one. Following the operations at steps 113 and 116, the transfer of two blocks of data (i.e., data of 2ByN bytes) is considered complete. At step 118, it is determined whether the number of data blocks not yet transferred, i.e., BLN is zero. If BLN is not zero, the operations at steps 112 through 118 are repeated until BLN reaches zero.

If it is determined at step 102 that BLN is an odd number, the routine examines, at step 103, whether the number BLN is 1. If BLN is 1, the process advances to the routine at step 104. At step 104, the current number BLN is reduced by one. At step 105, one block of data is transferred to complete the entire data transfer.

If, at step 103, BLN is determined to be an odd number greater than 1, the data transfer routine advances to the operation at step 106 where the byte counter is set have the first target value ByN+1. At step 107, ByN+1 bytes of data are transferred as one block of data, and the byte counter is decremented. At step 108, the current number BLN is reduced by one. Following this at step 109, the byte counter is set to a second target value of ByN−1. At step 110, ByN−1 bytes of data are transferred as one block of data in a manner similar to step 107. At step 111, the new value for BLN is reduced by one. Once finished with the procedures at steps 107 and 110, the controller routine then considers the transfer of two blocks of data (i.e., 2ByN bytes of data) as having been complete. The routine then returns to step 103, and repeats the operations at steps 106 to 111 until the value of BLN is equal to 1. When the value of BLN reaches 1, the operations at steps 104 and 105 are executed, completing the transfer of an odd block data set.

The above described conventional data transfer process can further be illustrated by reference to the following example and to FIG. 2. In this example, suppose that a data block to be transferred contains an odd number of bytes (e.g., 5), and that the variable number of blocks to be transferred is set to 1. As shown in FIG. 2, data transfer must occur three times. Five single-bytes of data B1, B2, B3, B4 and B5 (delineated by the bold line in FIG. 2) effectively form one data block. During the first data transfer, bytes B1 and B2 are supplied to the lower and upper bit lines of the SCSI bus, respectively. In the second data transfer, bytes B3 and B4 are supplied to the lower and upper bit lines of the SCSI bus, respectively. During the third data transfer, the last byte B5 of the block is supplied to the lower bit lines of the SCSI bus while dummy data X0 is supplied as ineffective byte data to the upper bit lines.

Next, assume that each data block contains an odd number of bytes (e.g., 5 bytes), and that the variable number of blocks to be transferred is an odd number greater or equal to 3. The first and second block transfers in this example, unlike in the previous example, contain no dummy data. This is because the fifth byte of the first block is combined with the first byte of the second block. In both examples, as shown in FIG. 2, both the last byte of data B5 in the last block and the ineffective dummy data X0 need to be supplied to the lower and upper bit lines of the SCSI bus, respectively.

Thus with conventional SCSI controllers, repeated odd block transfers of multiple data sets requires the use of dummy data for the last block of data, that is, when odd number of bytes are transferred. This significantly reduces data transfer efficiency. Transfer efficiency is further degraded by the need for a SCSI controller on the target end of the data transfer. Such a controller is needed to eliminate the added dummy byte from the transferred data. Moreover, conventional data transfer routines, such as that shown in FIG. 1, contain large numbers of processing steps. This factor further contributes to the inefficient operation of conventional controllers.

SUMMARY OF THE INVENTION

Accordingly, it is a primary object of the present invention to provide method and apparatus that efficiently transfers data in units of 2 bytes without the need of using dummy data.

To achieve the foregoing and other objects and in accordance with the purpose of the present invention, an improved data transfer apparatus is provided, which continuously or intermittently transmits and/or receives a plurality of data sets, each data set including data of a predetermined number of bytes.

The data transfer apparatus includes a data resister, an interface, a byte counter and a processor. The data register temporarily stores data of a data set involved in data transfer. The interface, coupled to the data register, transmits the data stored in the data register in units of 2 bytes and receives data externally supplied thereto in units of 2 bytes. The byte counter counts the number of bytes of data transmitted from or received by the interface. The processor, coupled to the byte counter, controls initial setting of a target count value of the byte counter. The data transfer apparatus further includes a data transfer controller, which is coupled to the interface, the byte counter and the processor, for controlling transmission of the data stored in the data register from the interface and data reception by the data register via the interface. The data transfer controller finishes a data transfer operation when the number of bytes of data that has passed through the interface reaches the target count value of the byte counter. The data register, the processor and the data transfer controller form transfer control means for controlling an operation of the data transfer apparatus in a data transmission mode and a data reception mode. In the data transmission mode, the data transfer control means selectively changes the target count value to be set in the byte counter to one of a plurality of corrected count values so that when the number of bytes of data to be transmitted is an odd number, last 1-byte data that is a remnant for data transmission in units of 2 bytes is not transmitted but left in the data register, and so that in subsequent data transmission in units of 2 bytes, the number of bytes of transmission data including the last 1-byte data left in the data register becomes an even number. In the data reception mode, the data transfer control means causes the data register to receive data of an even number of bytes in first data reception in units of 2 bytes, and controls the output of data of a predetermined number of bytes from the data register so that last 1-byte data is left in the data resister when the predetermined number of bytes of a data set to be received is an odd number.

The data transmission method according to the present invention is provided, for transmitting a plurality of data sets to a data receiptor as a data transmission target, each data set including data of a predetermined number of bytes. The data transmission method includes the steps of:

using a data transmission controller including a data register, a transmission interface and a byte counter, and being capable of transmitting data in units of 2 bytes;

storing data of a data set to be transmitted in the data register;

setting in the byte counter a target count value corresponding to the number of bytes of data to be transmitted from the transmission interface;

determining whether the number of bytes of the data to be transmitted is an odd number;

when the number of bytes of the data to be transmitted is an odd number, calculating a first corrected target count value so that last 1-byte data that is a remnant for first data transmission in units of 2 bytes is not transmitted but left in the data register;

setting the calculated first target count value in the byte counter in place of the currently set target count value; and finishing data transmission from the transmission interface when the number of bytes of data that has been transmitted from the transmission interface reaches the target count value set in the byte counter.

The data reception method according to the present invention is provided, for receiving a plurality of data sets from a data transmitter as a data transmission source. The data reception method includes the steps of:

using a data reception controller including a data register, a reception interface and a byte counter and being capable of receiving data in units of 2 bytes, the data reception controller being connected to a processing unit that uses received data;

setting in the byte counter a target count value corresponding to the number of bytes of data to be received by the data register;

starting first data reception in units of 2 bytes by the data register via the reception interface;

finishing the data reception by the data register when the number of bytes of data that has been received via the reception interface reaches the target count value set in the byte counter, whereby data of an even number of bytes is stored in the data register; and when a predetermined number of bytes of a data set to be received is an odd number, transferring data of the predetermined number of bytes to the processing unit so as to leave last 1-byte data in the data register.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2 is an example of byte arrangement in a data block for a conventional 16 bit SCSI controller;

FIGS. 11A and 11B are tables listing control modes of transmission and reception according to the present invention.

DETAILED DESCRIPTION OF THE PREFERRED EMBODIMENTS

Figure 1:
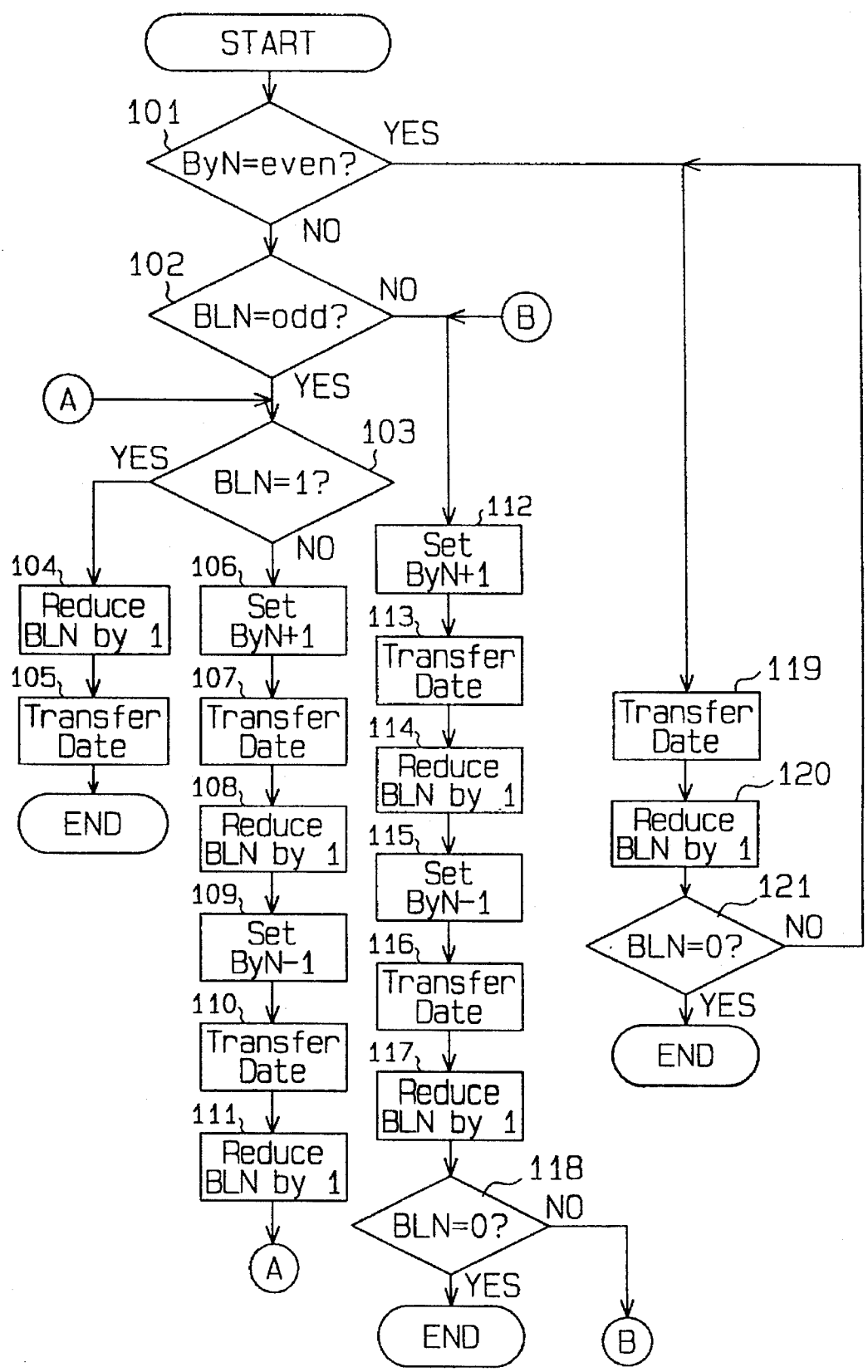
FIG. 1 is a flowchart showing an operational routine typical for SCSI controller control of data transfer.

A detailed explanation of the present invention will now be given with reference to FIGS. 3 through 11B. As shown in FIG. 4, a hard disk drive 1, a laser printer 2 and a personal computer 3 respectively utilize a small computer system interface (SCSI) controller 5, 6 and 7. The controller for each device controls the data transfer between the device and other connected devices. A SCSI bus 4 provides a data path for the controllers 5, 6 and 7.

Figure 5:
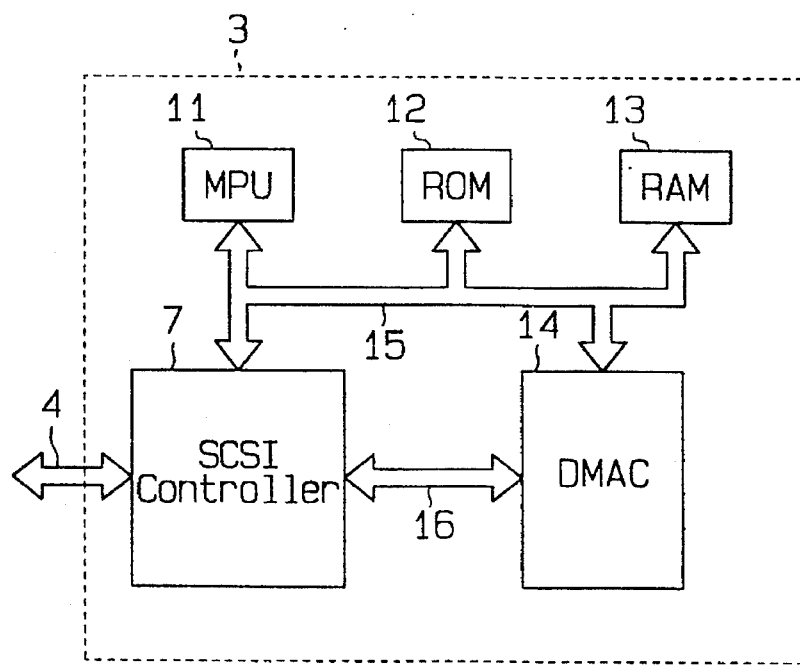
FIG. 5 shows a general configuration of a personal computer.

In FIG. 5, the computer 3 is shown equipped with a microprocessing unit (MPU) 11, read only memory (ROM) 12 for permanently storing data, random access memory (RAM) 13 for temporarily storing data, a SCSI controller 7 and a direct memory access controller (DMAC) 14, all of which are interconnected by MPU bus 15.

The MPU 11 performs various operations, including data transfer, based on the programs stored in the ROM 12. The data provided by the MPU 11 to the SCSI controller 7 contains information descriptive of both the number of blocks in the transmitted or received data and of the number of bytes in each data block.

Figure 7:
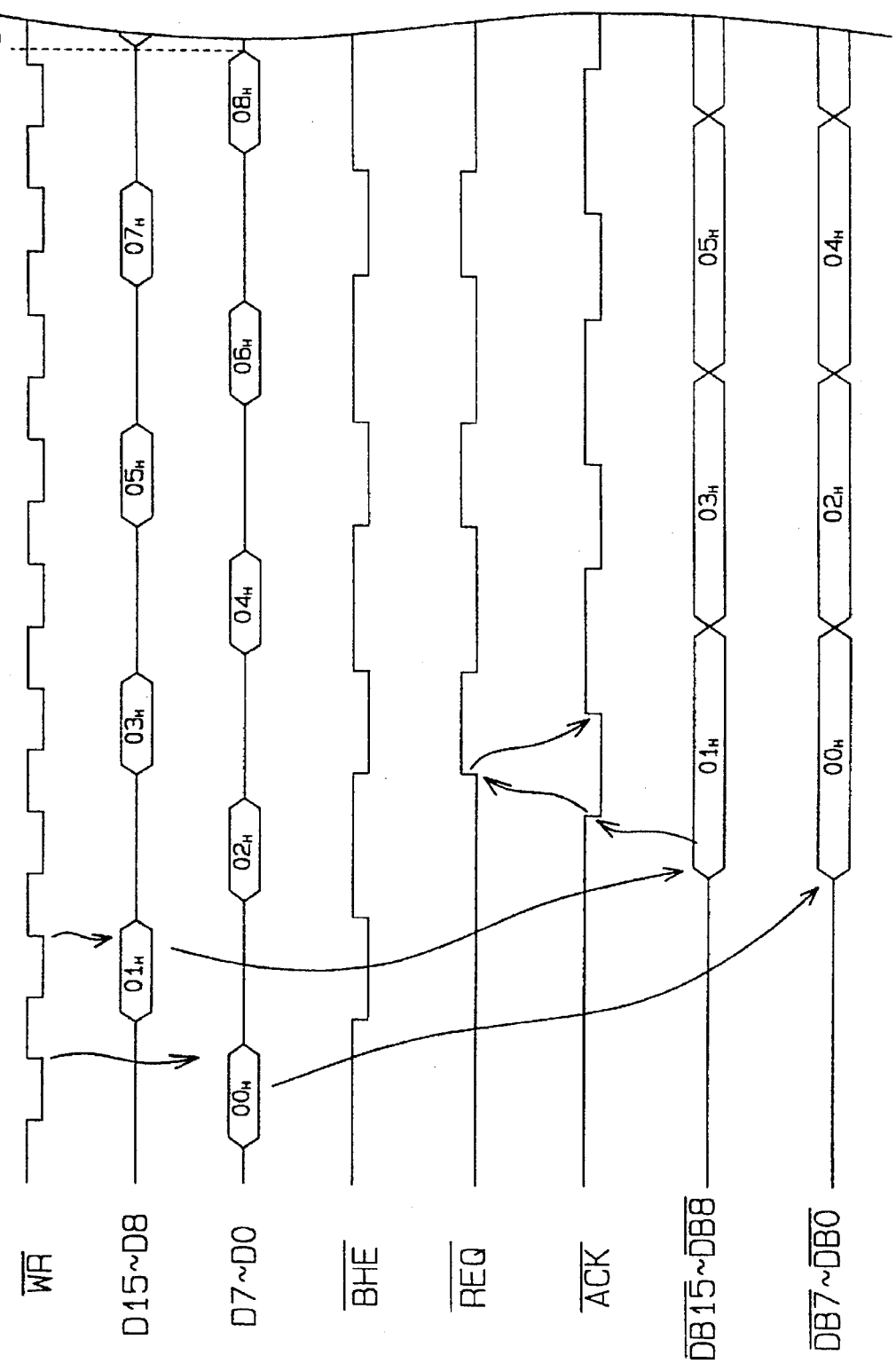
FIGS. 7 and 8 illustrate various data transmission timing charts of the personal computer.
Figure 8:
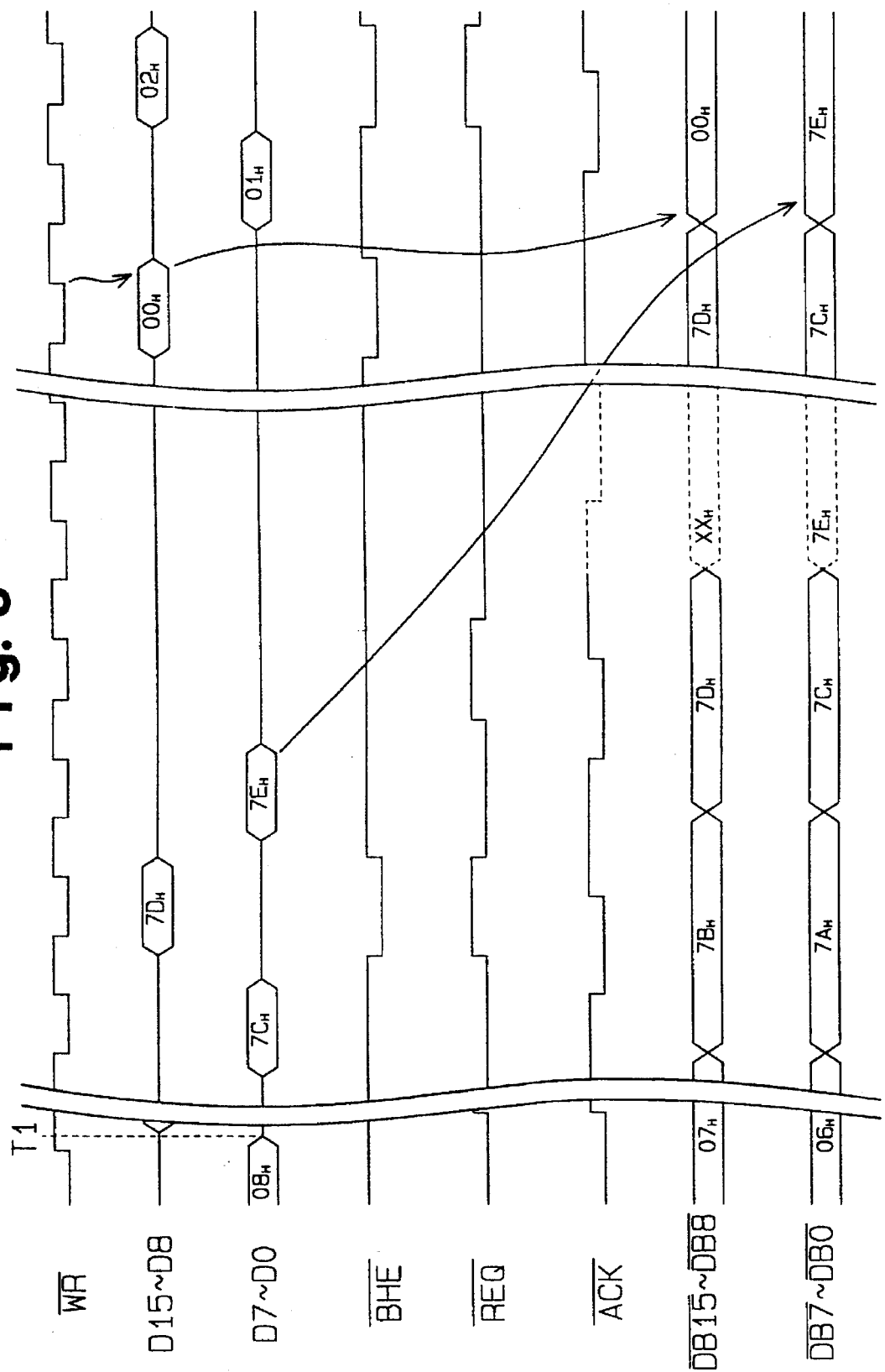

When the computer 3 transmits data, the MPU 11 reads data from the RAM 13 on a 1-byte basis and supplies it to the SCSI controller 7. A timing chart typical for this type of operation is shown in FIGS. 7 and 8. As seen from these charts, the MPU 11 provides the SCSI controller 7 with a write signal /WR that goes low in synchronism with the output of a 1-byte data segment. The falling edge of a switching signal /BHE occurs with a period corresponding to 2 cycles of the write signal /WR. When the switching signal /BEE rises high, 1-byte of data is supplied as lower-bit data D7–D0 to the SCSI controller 7. When the switching signal /BHE falls low, an additional 1-byte of data is supplied as upper-bit data D15–D8 to the SCSI controller 7.

Figure 9:
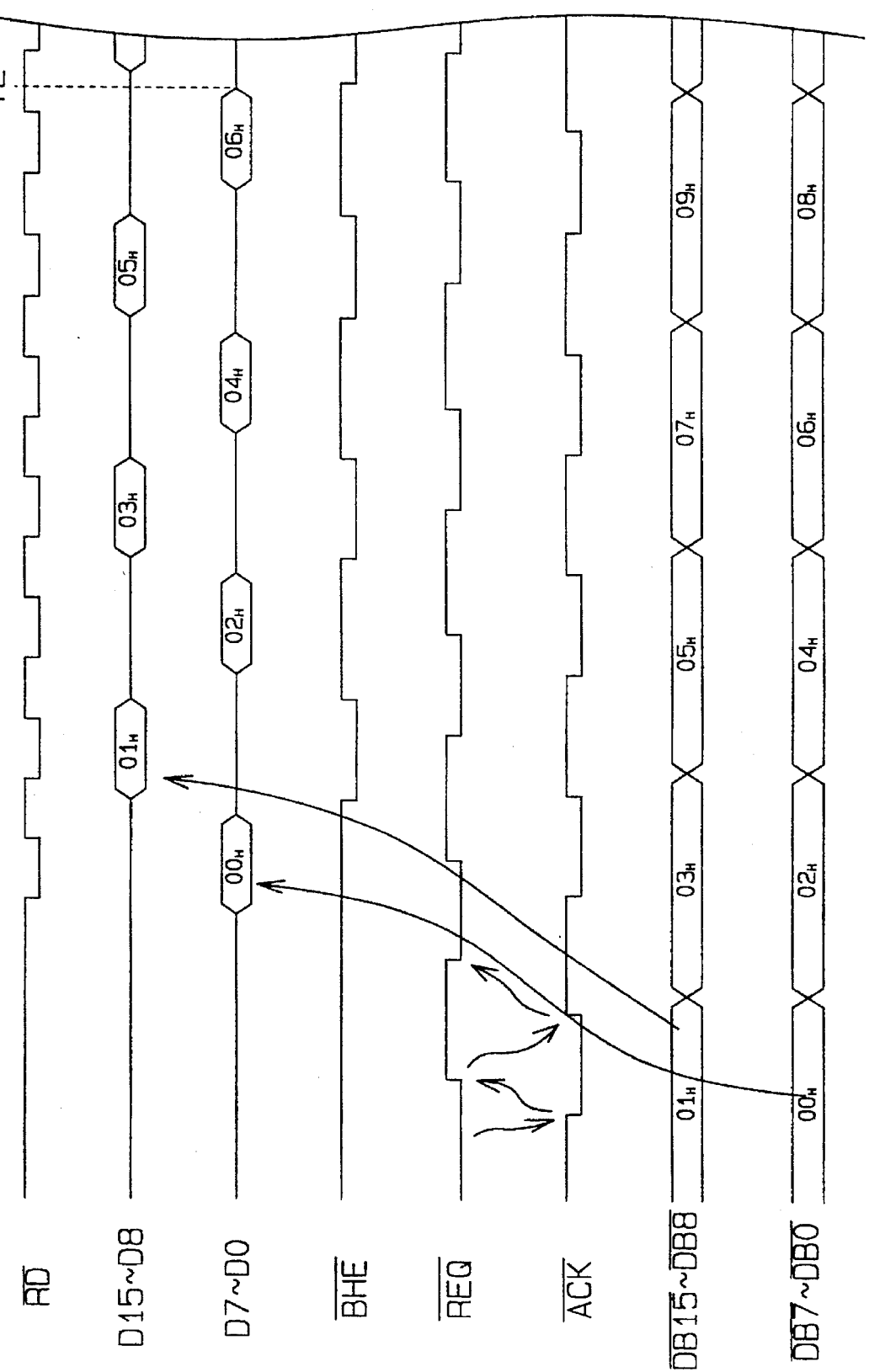
FIGS. 9 and 10 are timing charts of data reception of the personal computer.
Figure 10:
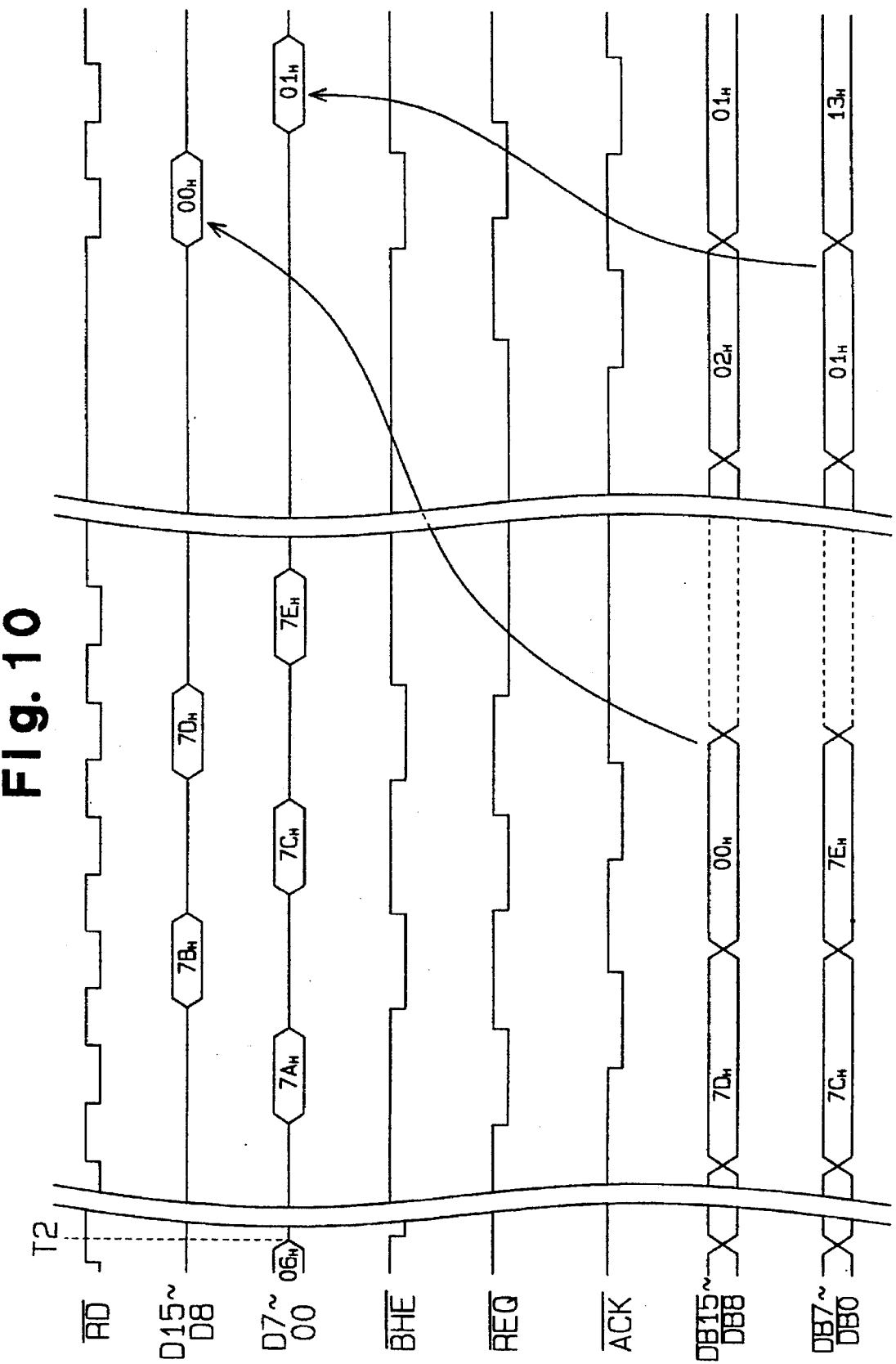

When the computer 3 receives data, the MPU 11 provides the SCSI controller 7 with a read signal /RD that periodically goes low as shown in the charts of FIGS. 9 and 10. This is done in order for the MPU 11 to receive data from the SCSI controller 7 on a 1-byte basis. In this operation, the MPU 11 provides the SCSI controller 7 with a switching signal BHE. The period which /BHE falls corresponds to 2 cycles of the read signal /RD. When the switching signal /BHE is set high, 1-byte of data is read out as lower-bit data D7–D0. When the switching signal /BHE is set low, another 1-byte of data is read out as upper-bit data D15–D8.

The DMAC 14 is connected to the SCSI controller 7 via the DMA bus 16. Based on instructions from the MPU 11, the DMAC 14 reads data directly from the RAM 13 and supplies it to the SCSI controller 7. This allows the MPU 11 to perform operations other than data transfer operation.

Figure 3:
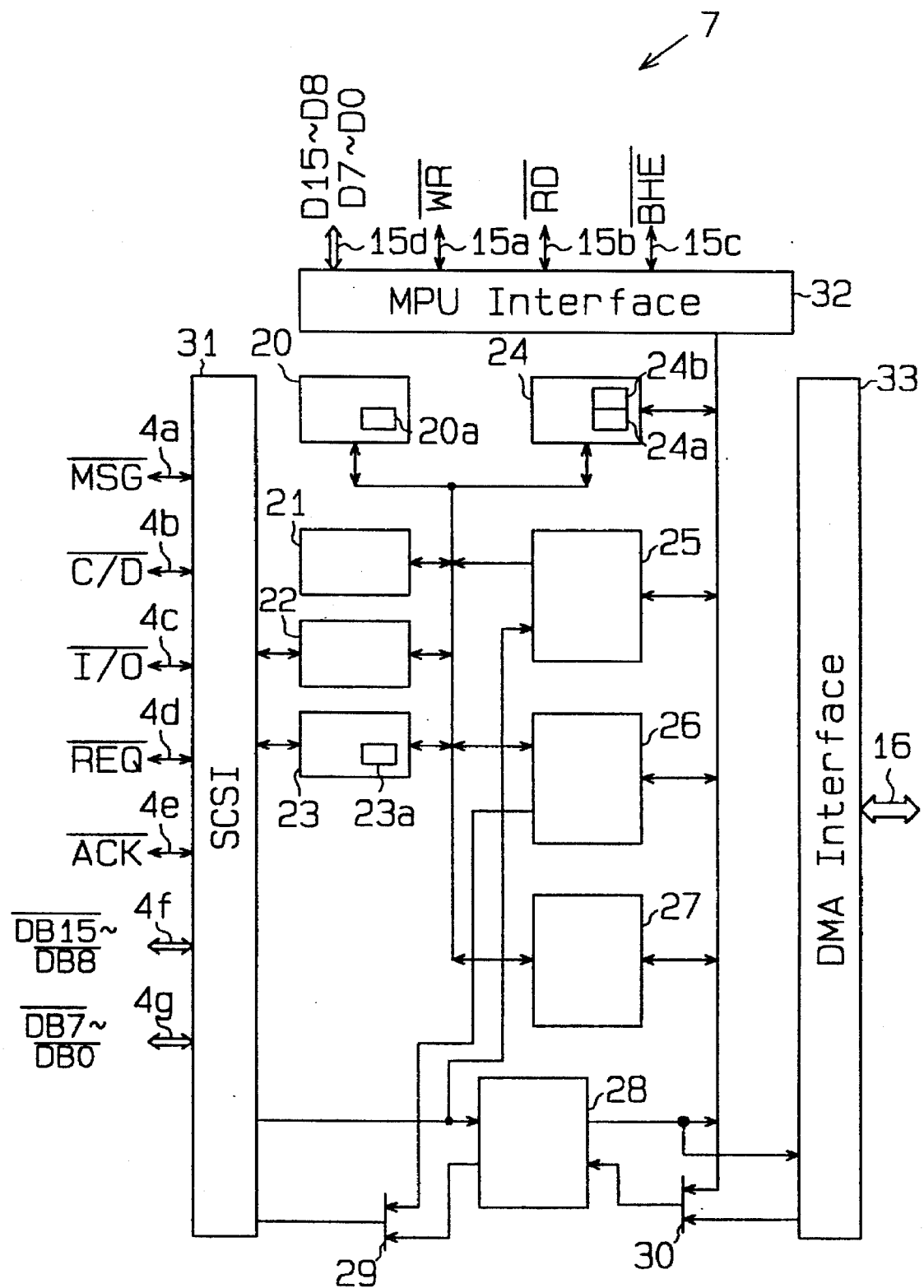
FIG. 3 is a block circuit diagram showing a SCSI controller according to an embodiment of the invention.
Figure 4:
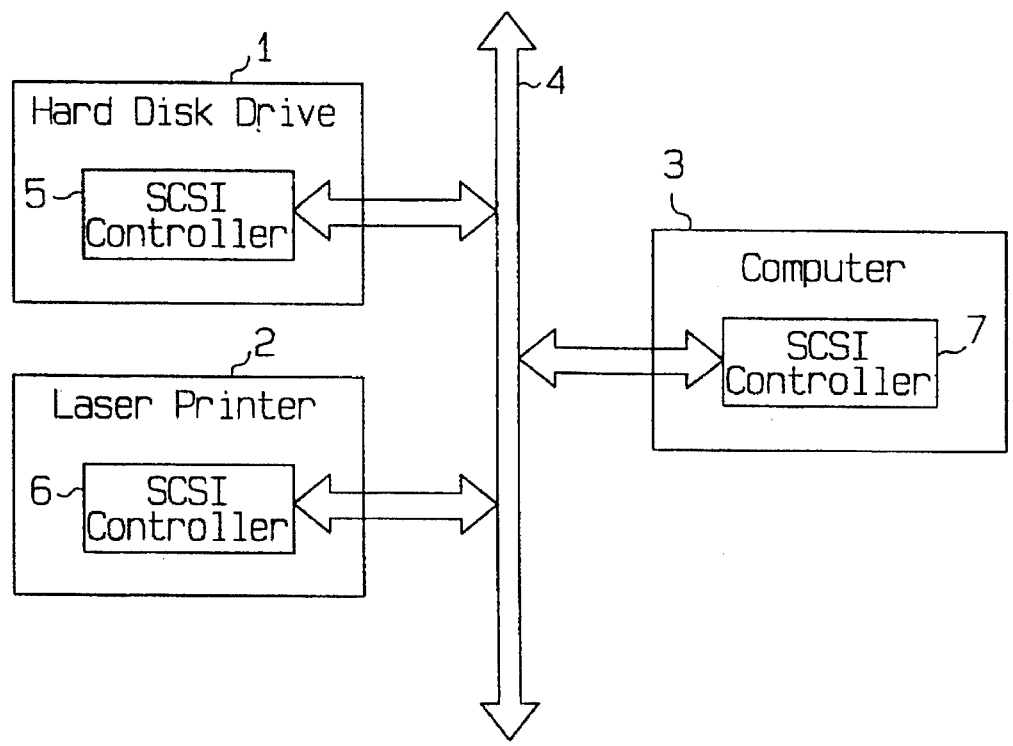
FIG. 4 shows a general configuration of a data transfer system.

Referring now to FIG. 3, the SCSI controller 7 integrated on a semiconductor chip, is equipped with an internal processor 20, a timer 21, a phase control circuit 22, a transfer control circuit 23, a group of control registers 24, a reception register 25, a transmission register 26, a user program memory 27, and a data register 28. The SCSI controller 7 further includes a SCSI 31, a MPU interface 32, and a DMA interface 33 connected to the DMA bus 16.

The MPU interface 32 is connected to the MPU bus 15. The MPU bus includes a signal line 15a for the read signal /WR, a signal line 15b for the read signal /RD, a signal line 15c for the switching signal /BHE, and 16-bit parallel bus line 15d. The bus line 15d is allocated to the 8 data bits D15–D8 and to the 8 data bits D7–D0.

The SCSI 31 is connected to the SCSI bus 4. The SCSI bus 4 includes five signal lines 4a to 4e, and 8-bit parallel bus lines 4f and 8-bit parallel bus lines 4g. The signal line 4d is used for a request signal /REQ output from a target or data transmission target, while the signal line 4e is used for an acknowledgement signal /ACK output from an initiator as a data transmission source. The bus lines 4f are used for the upper 8 data bits DB15–DB8, while the bus lines 4g are used for the lower 8 data bits DB7–DB0. The SCSI 31 transmits or receives data in units of 2 bytes via the bus lines 4f and 4g.

The control registers 24 include a block counter 24a, which counts the number of blocks of a data set to be transferred, and a byte counter 24b, which counts the number of bytes in one block. The MPU 11 registers both the number of data blocks contained in one data set and the number of bytes in one data block in the block and byte counters 24a and 24b, respectively. To doing this, the MPU 11 uses the MPU interface 32 and an internal bus of the SCSI controller 7. The internal processor 20 can also set the number of blocks in one data set and the number of bytes in one block in the counters 24a and 24b.

The reception register 25 stores messages, commands and status information received by the SCSI 31. Similarly, the transmission register 26 stores messages, commands and data transfer status information received by the MPU interface 32. Commands necessary for data transfer are stored in advance in the user program memory 27 from the MPU 11 via the MPU interface 32.

The data register 28 has one input terminal connected to the SCSI 31, another input terminal connected to a first multiplexer 30, an output terminal connected to a second multiplexer 29, and another output terminal connected to both the MPU interface 32 and the DMA interface 33. The first multiplexer 30 is connected to the MPU interface 32 and the DMA interface 33. The second multiplexer 29 receives the messages, commands and status information used for data transmission from the transmission register 26.

When data is transmitted, the first multiplexer 30 selects either the MPU interface 32 or the DMA interface 33. Data to be transmitted is written to the data register 28 from the RAM 13 via the selected interface by the number of blocks corresponding to one data set. The data stored in the data register 28 is supplied on a 2-byte basis to the SCSI 31 via the second multiplexer 29. Individual data bits of each 2-byte data is supplied, as upper 8 bit data and lower 8 bit data, to the bus lines 4f and 4g via the SCSI 31.

When data is received, individual 2-byte data input to the SCSI 31 via the bus lines 4f and 4g are sequentially stored, as part of a data set to be received, in the data register 28. The input data that has been stored in the data register 28 is read by the MPU 11 via the MPU interface 32 and stored into the RAM 13, by the number of bytes corresponding to one block.

The internal processor 20 not only performs sequence control in accordance with commands from the MPU 11, but also corrects transfer errors that may occur in the transfer operation. The internal processor 20 reads the commands stored in the user program memory 27 responding to the commands sent from the MPU 11, and performs the sequence control for data transfer.

The internal processor 20 has a number-of-bytes register 20a, which stores the number of bytes of a data block to be transmitted or received during data transfer. The number of bytes set in the byte counter 24b is also set in the number-of-byte register 20a by the internal processor 20.

The timer 21 performs time management according to known SCSI standard, offset and period management during synchronous data transfer, and set-up time management during asynchronous data transfer. The set-up time management includes management of output timing of the request signal /REQ or the acknowledgement signal /ACK.

The phase control circuit 22 manages information transfer phase of the SCSI bus 4. The information transfer phase is set to one selected from message phase, command phase, status phase and data phase, based on signals /MSG, /(C/D) and /(I/O).

The transfer control circuit 23 outputs an acknowledgement signal /ACK when the corresponding SCSI controller 7 serves as an initiator, and outputs a request signal /REQ when the corresponding SCSI controller 7 serves as a target. The transfer control circuit 23 controls data transfer operation based on handshaking with the signals /REQ and /ACK through the SCSI bus 4.

During data transfer, the transfer control circuit 23 allows the SCSI 31 to transmit or receive data in units of 2 bytes, and subtracts 2 from the count value of the byte counter 24b every transfer of 2-byte data. When data is transmitted, the transfer control circuit 23 allows the data register 28 to output data on a 2-byte basis, and erases, from the register 28, the data already output therefrom. When data is received, the transfer control circuit 23 stores 2-byte data that has come to the SCSI 31 into the data register 28. The transfer control circuit 23 subtracts 1 from the count value of the block counter 24a every time the count value of the byte counter 24b reaches zero, i.e., transfer of 1-block data is completed.

The transfer control circuit 23 has a flag register 23a. The flag register manages a flag as bit data that indicates whether there remains 1-byte data in the data register 28. Specifically, the flag of the register 23a indicates whether there remains the last 1-byte data of the preceding block in the data register 28 when byte data of each block is transmitted from the SCSI 31 with the byte counter 24b decremented. The flag of the flag register 23a also indicates whether there remains in the data register 28 the last 1-byte received data of the block preceding the data now about to be received after data that has been stored into the data register 28 from the SCSI 31 is read by the MPU 11 in accordance with the value set in the number-of-bytes register 20a. In this embodiment, if the last 1-byte data of 1-block data remains in the data register 28 at a time when the transmission or reception of the data block has been completed, an odd number flag, i.e., "1" is set in the flag register 23a. If the last 1-byte data of the 1-block data does not remain in the data register 28, an even number flag, i.e., "0" is set in the flag register 23a.

Prior to the transmission or reception of 1-block data, the internal processor 20 instructs the transfer control circuit 23 to reset the initial value of the byte counter 24a according to tables shown in FIGS. 11A and 11B based on the flag value of the flag register 23a and the number of bytes per block indicated by the number-of-byte register 20a. As shown in FIGS. 11A and 11B, if the number of bytes per block is an odd number, the internal processor 20 instructs the transfer control circuit 23 to change the flag value of the flag register 23a. If the number of bytes per block is an even number, the internal processor 20 makes the flag register 23a maintain the flag value.

In the tables shown in FIGS. 11A and 11B, N means the number of bytes per block. M1, M2, M3 and M4 represent four data transmission modes, and M5, M6, M7 and M8 represent four data reception modes. These eight modes are derived from the flowchart of FIG. 6.

Referring to the flowchart of FIG. 6, a description will be made of the data transfer performed by the SCSI controller 7 according to this embodiment. Determinations of steps 41, 42, 44, 48, 49 and 50 are performed by the internal processor 20. Operations of steps 43, 45, 46, 47, 51 and 52 are triggered by the transfer control circuit 23.

At step 41, it is determined which is required data transmission or data reception. If data transmission is required, it is determined at step 49 based on the value retained by the number-of-byte register 20a whether the original number N of bytes of each block in the data set to be transferred is an odd number. When the number N is an even number, it is again judged at step 44 that the number of bytes, N, is not an odd number, and then the processing of step 46 is executed. At step 46, data is transmitted to a data transmission target in units of 2 bytes by the number of bytes of one data block. At step 47, the number of blocks BLN, i.e., the value indicated by the block counter 24a is reduced by 1, and then the byte counter 24b is reset to the original value, N, that is retained by the number-of-byte register 20a.

At step 48, it is judged whether the number BLN of blocks that have not been transferred (or transmitted) reaches zero. As long as its number BLN is not zero, the series of steps 41, 49, 44 and 46–48 are executed repeatedly. When it is judged at step 48 that the number BLN is zero, the data transmission process is finished with a judgment that all the data of the data set has been transferred.

When the number N of bytes of each block in the data set to be transferred is an odd number at step 49, it is then judged at step 50 whether the flag value of the flag register 23a is an odd number, i.e., "1". If its flag is set to 1, the count value of the byte counter 24b is set at a corrected target value N+1 in step 51 and the routine goes to step 44. When the flag value is an even number, i.e., "0" at step 50, the count value of the byte counter 24b is set at another corrected target value N−1 and the routine goes to step 44.

After it is confirmed at step 44 that the original number of bytes, N, is an odd number, the flag or bit data of the flag register 23a is inverted at step 45. At step 46, data is transferred to a data transmission target in units of 2 bytes by the number of bytes of one block. At step 47, the count value BLN of the block counter 24a is reduced by 1, and the value of the byte counter 24b is reset to the original value retained by the number-of-bytes register 20a.

As long as the number of blocks BLN is not zero at step 48, the routine returns to step 41 to repeatedly execute steps 41, 49, 50 and the following steps. When it is judged at step 48 that the number BLN is zero, the data transmission process is finished with a judgment that all the data of the data set has been transferred.

When data reception is required at step 41, it is then judged at step 42 whether the flag value of the flag register 23a is an odd number, i.e., "1". When the flag value is "1", the byte counter 24b is set to have a corrected target value N−1 at step 43 and the routine goes to step 44. If the flag value is judged to be an even number at step 42, the routine goes to step 44 skipping step 43.

When the original number of bytes, N, is an even number at step 44, the routine goes to step 46. When the number N is an odd number at step 44, the flag or bit data of the flag register 23a is inverted at step 45 and the routine goes to step 46. At step 46, data is received from a data transmission source in units of 2 bytes until the counted number of bytes reaches the number of bytes of one block. At step 47, the count value BLN of the block counter 24a is reduced by 1, and the count value of the byte counter 24b is reset to the original value retained by the number-of-bytes register 20a.

As long as it is not judged at step 48 that the number of blocks BLN is zero, the routine returns to step 41 to repeatedly execute steps 41 and 42 and the following steps. When the number of blocks BLN is zero at step 48, the data reception process is finished with a judgment that all the data of the data set has been received.

Next, four cases of data transmission will be described.
(Case 1)

A description will be made of a case where a data set is transmitted for the first time in which the number of blocks is a constant even number and the number of bytes of each block is 5 (odd).

The transmission of the first data block corresponds to transmission mode M3, because the number of bytes is an odd number. Accordingly, the byte counter 24b is set to have a value N−1, i.e., 4 (at step 52), and the flag value is changed from 0 to 1 (at step 45). That is, in the transmission of the first data block, 4 bytes of data (two 2 bytes of data) is transmitted in units of 2 bytes via the SCSI bus 4. The last 1-byte data of the first block remains in the data register 28. After the transmission of the first block (4 bytes) is completed, the byte counter 24b is reset to have the original value N, i.e., "5".

The transmission of the second data block corresponds to transmission mode M4, because the flag value is an odd number "1". Accordingly, the byte counter 24b is set to have a value N+i, i.e., "6" (at step 51), and the flag value is changed from 1 to 0 (at step 45). That is, in the transmission of the second block, data of 6 bytes in total that is the 1-byte data remaining in the data register 28 plus 5 bytes of data of the second data block is transmitted in units of 2 bytes via the SCSI bus 4 (three 2-byte data are transmitted). Thus, it is not necessary to transmit dummy data (ineffective data) as upper 8 bits of the SCSI bus 4. After the completion of 6 bytes data transfer or the second data block transfer, the byte counter 24b is reset to have the original value N, i.e., "5".

In the transmission of the third and following data blocks, modes M3 and M4 are repeated alternately while the flag indication control and the management of the initial value of the byte counter 24b are performed in the same manner as described above. Thus, the transmission of the data set is completed. At this time point, there does not remain in the data register 28 any data that has not been transmitted, and no dummy data is transmitted as upper 8 bits of the SCSI bus 4.

(Case 2)

A description will be made of a case of transmitting first to third data sets. In the first data set, the number of blocks is variable and initially set to 1, and the number of bytes of the block is an odd number. In the second data set, each block has an even number of bytes. In the third data set, the number of blocks is variable and initially set to 1, and the number of bytes of the block is an odd number.

The transmission of the first data set corresponds to mode M3, because the flag is initially set at an even number "0" and the number of bytes, N, is an odd number. Accordingly, the byte counter 24b is set to have a value N−1 that is an even number (at step 52) and the flag value is changed from the even number "0" to the odd number "1" (at step 45). That is, in the transmission of the first data set, (N−1) bytes of data is transmitted in units of 2 bytes via the SCSI bus 4, and the data transmission is finished with the last 1-byte data of that block left in the data register 28.

The transmission of the second data set corresponds to mode M2, because the current flag value is 1 and the number of bytes of each block, N, is an even number. In transmission mode M2, the flag value is not changed and the number of bytes is not reset. Therefore, in the data transmission of the first block of the second data set, data of N (even) bytes including the 1-byte data remaining in the data register 28 is transmitted in units of 2 bytes via the SCSI bus 4. As a result, the last 1-byte data of the first block is left in the data register 28.

In the data transmission of the second and following blocks of the second data set, the flag value is kept at 1 and mode M2 is maintained. Therefore, when data of N (even) bytes of each block is transmitted in units of 2 bytes in the same manner as described above to complete the data transmission of each block, the last 1-byte data of each block is left in the data register 28. As a result, the transmission of the second data set is finished with the last 1-byte data of the last block is left in the data register 28.

The transmission of the third data set corresponds to mode M4, because the current flag is 1 and the number of bytes of the single block, N, is an odd number. Accordingly, the byte counter 24b is set to have a value N+1 that is an even number (at step 51) and the flag value is changed from the odd number "1" to the even number "0" (at step 45). That is, in the transmission of the third data set, data of N+1 bytes in total that is the 1-byte data remaining in the data register 28 plus the N bytes of data of that block is transmitted in units of 2 bytes to complete the transmission. Therefore, no dummy data is transmitted as upper 8 bits of the SCSI bus 4.

(Case 3)

A description will be made of a case of receiving a data set from an data transmission source. The received data set, the number of blocks is a constant even number and the number of bytes of each block is 5 (odd).

In the reception of the first data block, when the fifth-byte data is received, the upper 8 bits of the SCSI bus also carry effective data as the sixth byte data. Thus, the data register 28 receives 6 bytes of data. This data reception corresponds to mode M7, because the number of bytes, N, is 5 and the flag value is zero. According to mode M7, the number of bytes N is maintained and the flag value is changed from the even number "0" to the odd number "1" (at step 45). Since the MPU 11 reads only 5 bytes of data from the data register 28, the last 1-byte data is left in the data resister 28. Upon the completion of the first data block reception, the byte counter 24b is reset to have the original value "5".

The reception of the second data block corresponds to mode MS, because the flag value has been set at 1 in the receiving operation of the first data block. Accordingly, the byte counter 24b is set to have a value N−1, i.e., 4 (at step 43) and the flag value is changed from 1 to 0 (at step 45). That is, when the second data block is received, the data register 28 stores data of 5 bytes in total that is the last 1-byte data of the first block reception plus the 4-byte data of the second block. Thus, the MPU 11 reads the 5 bytes of data from the data register 28, so that the data (10 bytes in total) of the first and second blocks are read by the MPU 11 without excess nor shortage. Upon the completion of the data reception of the second block, the byte counter 24b is reset to have the original value "5".

In the reception of the third and following data blocks, modes M7 and M8 are repeated alternately while the flag indication control and the management of the initial value of the byte counter 24b are performed in the same manner. Thus, the reception of the data set is finished. At this time point, no data remains in the data register 28. Since the SCSI controller 7 of this embodiment has not taken in any dummy data during the reception of the data set, there is no need of eliminating dummy data.

(Case 4)

A description will be made of a case of receiving first to third data sets. In the first data set, the number of blocks is variable and initially set to 1 and the number of bytes of the single block, N, is an odd number. In the second data set, each block has an even number of bytes. In the third data set, the number of blocks is variable and initially set to 1 and the number of bytes of the block is an odd number.

In the reception of the first data set, when the N-th byte data, carried by the lower 8 bits of the SCSI bus 4, is received, effective data is also carried by the upper 8 bits of the SCSI bus 4. As a result, the data register 28 receives (N+1) bytes of data. This data reception corresponds to mode M7, because the number of bytes N is an odd number and the flag value is the even number "0". According to reception mode M7, the number of bytes N is maintained and the flag value is changed from the even number "0" to the odd number "1". Since the MPU 11 reads only N bytes of data from the data register 28, the reception is finished with the last 1-byte data left in the data register 28.

The reception of the second data set corresponds to mode M6, because at the start of the data reception the number of bytes of each block, N, is an even number and the flag value is 1. According to reception mode M6, the flag indication is not changed. When the first block of the second data set is received, the byte counter 24b is set to have a value N-1 (odd number). However, when the (N-1)th-byte data, carried by the lower 8 bits of the SCSI bus 4, is received, effective data is also carried by the upper 8 bits of the SCSI bus 4. As a result, N bytes of data is stored in the data register 28. When the first block of the second data set has been received, the data register 28 stores data of N+1 bytes in total that is the remaining 1-byte data in the data reception of the first data set plus the N bytes of data of the first data block. Since the MPU 11 reads only N bytes of data from the data register 28, the reception of the first data block of the second data set is finished with the last 1-byte data left in the data register 28. At this time point, the byte counter 24b is reset to have the original value N.

In data reception of the second and following blocks of the second data set, the flag value is not changed and reception mode M6 is maintained. Therefore, the byte counter 24b is set to have a value N-1 (odd number). When the (N-1)th-byte data is received, effective data is carried by the upper 8 bits of the SCSI bus 4. Therefore, N bytes of data is stored in the data register 28. In the data reception of each of the second and following blocks, the last 1-byte data of each block is left in the data register 28. Since the MPU 11 reads only N bytes of data from the data register 28, the data reception is finished with the last 1-byte data of the last block of the second data set left in the data register 28.

The reception of the third data set corresponds to mode M8, because the flag value is 1 and the number of bytes N is an odd number. Therefore, the byte counter 24b is set to have a value N-1 (even number). Then, the data register 28 stores data of N bytes in total that is the last, remaining 1-byte data of the second data set plus the (N-1) bytes of data newly received. The flag value is changed from 1 to 0. After the reception of the third data set has been completed, the MPU 11 reads only N bytes of data from the data register 28. Therefore, no data remains in the data register 28. The SCSI controller 7 of this embodiment has not taken in any dummy data until the reception of the third data set is completed. Accordingly, there is no need of eliminating dummy data.

According to the SCSI controller 7 of this embodiment, even where a plurality of data sets are transmitted in units of 2 bytes by using the SCSI bus 4 of 16 bits, it is not necessary to supply dummy data to the upper 8 bits of the SCSI bus 4. This contributes to improvement of the data transmission efficiency. The improvement of the data transmission efficiency can be attained by the flag register 23a provided in the transfer control circuit 23. Since flag register is generally a simple device, the provision of the flag register 23a does not increase the production cost of the SCSI controller 7.

Figure 6:
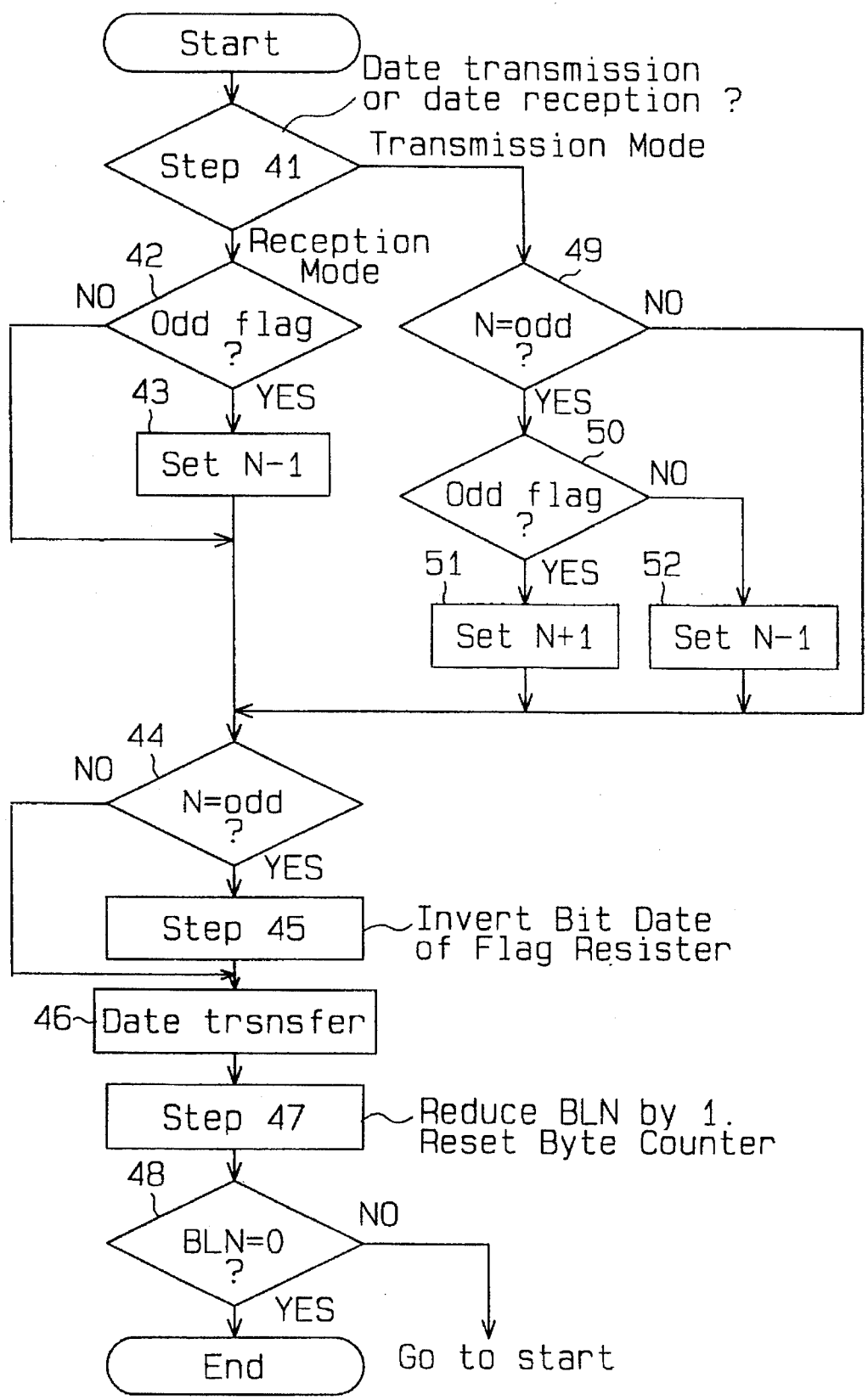
FIG. 6 is a flowchart illustrating the operational routine executed by the SCSI controller of FIG. 3.

The provision of the flag register 23a decreases the number of steps of the data transfer program as shown in FIG. 6, that is, simplifies the data transfer process.

Although only one embodiment of the present invention has been described herein, it should be apparent to those skilled in the art that the present invention may be embodied in many other specific forms without departing from the spirit or scope of the invention. Particularly, it should be understood that the invention may be embodied in the following modes of operation.

In reception mode M6 in FIG. 11B, the number of bytes N may be maintained rather than is reset to a value N-1. In this case, the number of bytes that has been set and the number of bytes that are actually received can be made equal to each other.

In reception mode M7 in FIG. 11B, the number of bytes may be reset to N+1. Also in this case, the number of bytes that has been set and the number of bytes that are actually received can be made equal to each other.

Therefore, the present examples and embodiments are to be considered as illustrative and not restrictive, and the invention is not to be limited to the details given herein, but may be modified within the scope of the appended claims.

What is claimed is:

1. A data transmitting apparatus for continuously or intermittently transmitting a plurality of data sets including first and second data sets, each data set including data of a predetermined number of bytes, said data transmitting apparatus comprising:

a data register for temporarily storing data of a data set to be transmitted;

a transmission interface coupled to the data register for transmitting the data stored in the data register in units of two bytes;

a byte counter for counting the number of bytes of data transmitted from said transmission interface;

a processor coupled to said byte counter for controlling initial setting of a target count value of the byte counter; and a data transfer controller coupled to said transmission interface, said byte counter and said processor, for controlling transmission of the data stored in the data register from the transmission interface, said data transfer controller finishing data transmission from said transmission interface when the number of bytes of data that has been transmitted from said transmission interface has reached the target count value of said byte counter, wherein said processor and said data transfer controller form transmission control means which selectively changes the target count value to be set in the byte counter to one of a plurality of corrected count values so that when the number of bytes of data in each data set to be transmitted is an odd number, last one-byte data that is a remnant for data transmission of said first data set in units of two bytes is not transmitted but left in the data register, and so that in subsequent data transmission of said second data set subsequent to said first data set in units of two bytes, the number of bytes of transmission data becomes an even number by combining said last one-byte data of said first data set left in the data register with an odd number of bytes of data of said second data set.

2. The data transmitting apparatus according to claim 1, wherein each of the plurality of data sets includes a plurality of data blocks each being data of a predetermined number of bytes; and wherein said data transmitting apparatus further comprises a block counter for counting the number of blocks that have been transmitted from the data transmitting apparatus.

3. The data transmitting apparatus according to claim 2, wherein said processor includes a number-of-bytes register for retaining the number of bytes of a data block to be transmitted, and judges whether the number of bytes retained by said number-of-bytes register is an odd number.

4. The data transmitting apparatus according to claim 3,
wherein said data transfer controller includes a flag register for managing a flag as bit data indicating whether last 1-byte data belonging to a previously transmitted data block remains in the data register, and inverts the bit data of the flag register when a value retained by said number-of-bytes register is an odd number; and
wherein said processor, cooperating with said data transfer controller, allows said byte counter to be set to have a corrected target count value that is obtained by reducing the number of bytes by 1 when the value retained by said number-of-bytes register is an odd number and the bit data of said flag register indicates that no data remains in said data register, and allows said byte counter to be set to have a corrected target count value that is obtained by adding 1 to the number of bytes when the value retained by the number-of-bytes register is an odd number and the bit data of the flag register indicates that the last 1-byte data remains in said data register.

5. A data receiving apparatus for continuously or intermittently receiving a plurality of data sets including first and second data sets, each data set including data of a predetermined number of bytes, said data receiving apparatus comprising:
a reception interface for receiving data externally supplied thereto in units of two bytes;
a data register coupled to said reception interface for temporarily storing a set of data received via said reception interface;
a byte counter for counting the number of bytes of data received by said reception interface;
a processor coupled to said byte counter for controlling initial setting of a target count value of said byte counter; and
a data transfer controller coupled to said reception interface, said byte counter and said processor, for controlling data reception by the data register via said reception interface, said data transfer controller finishing the data reception by said reception interface when the number of bytes of data that has been received via said reception interface has reached the target count value of said byte counter,
wherein said data register, said processor and said data transfer controller form reception control means which causes said data register to receive an even number of bytes of data in first and second data receptions in units of two bytes and which controls the output of a predetermined number of bytes of data from said data register so that when the predetermined number of bytes of data set to be output is an odd number, first last one-byte data of said even number of bytes of data is left in said data resister and the remaining odd number of bytes of data is output from said data register as said first data set in the first data reception, and so that an odd number of bytes of data as said second data set is output by combining said first last one-byte data left in said data register with an even number of bytes of data received in the second data reception.

6. The data receiving apparatus according to claim 5, wherein in the second data reception in units of two bytes subsequent to said first data reception in units of two bytes, said reception control means changes the target count value of said byte counter to a corrected target count value that is an even number so that a sum in the number of bytes of data newly taken in by the data register in the second data reception and the first last one-byte data left in said data register becomes equal to the predetermined number of bytes of said second data set to be output which is an odd number.

7. The data receiving apparatus according to claim 5, wherein in the second data reception in units of two bytes subsequent to said first data reception in units of two bytes, said reception control means causes said data register to receive data of an even number of bytes and controls the output of the predetermined number of bytes of data from said data register so that when the predetermined number of bytes of data of said second data set to be output is an odd number, second last one-byte data of said even number of bytes of data is left in said data register, and so that an even number of bytes of data is output from the data register as said second data set by combining said first last one-byte data previously left in said data register with the remaining odd number of bytes of data.

8. The data receiving apparatus according to claim 5, wherein each of the plurality of data sets includes a plurality of data blocks, each being data of a predetermined number of bytes; and wherein said data receiving apparatus further comprises a block counter for counting the number of blocks that have been received by said data receiving apparatus.

9. The data receiving apparatus according to claim 8, wherein said processor includes a number-of-bytes register for retaining the number of bytes of a data block to be received, and judges whether the number of bytes retained by said number-of-bytes register is an odd number.

10. The data receiving apparatus according to claim 9,
wherein said data transfer controller includes a flag register for managing a flag as bit data indicating whether last one-byte data belonging to a previously received data block remains in said data register and inverts the bit data of said flag register when a value retained by said number-of-bytes register is an odd number; and
wherein said processor, cooperating with said data transfer controller, allows said byte counter to be set to have a corrected target count value obtained by reducing the number of bytes retained by said number-of-bytes register by one when the bit data of said flag register indicates that the last one-byte data remains in said data register.

11. A data transfer apparatus for continuously or intermittently transmitting therefrom and receiving a plurality of data sets including first and second data sets, each data set including data of a predetermined number of bytes, said data transfer apparatus comprising:

a data register for temporarily storing data of a data set involved in data transfer;

an interface coupled to said data register for transmitting the data stored in said data register in units of two bytes and for receiving data externally supplied thereto in units of two bytes;

a byte counter for counting the number of bytes of data transmitted from or received by said interface;

a processor coupled to said byte counter for controlling initial setting of a target count value of said byte counter; and a data transfer controller, coupled to said interface, said byte counter and said processor, for controlling transmission of the data stored in said data register from said interface and controlling data reception by said data register via said interface, said data transfer controller finishing a data transfer operation when the number of bytes of data that has passed through said interface reaches the target count value of said byte counter, wherein said data register, said processor and said data transfer controller form transfer control means for controlling an operation of the data transfer apparatus in a data transmission mode and a data reception mode;

wherein in the data transmission mode, said data transfer control means selectively changes the target count value to be set in the byte counter to one of a plurality of corrected count values so that when the number of bytes of data of each data set to be transmitted is an odd number, last one-byte data that is a remnant for data transmission of said first data set in units of two bytes is not transmitted but left in said data register, and so that in subsequent data transmission of said second data set subsequent to said first data set in units of two bytes, the number of bytes of transmission data becomes an even number by combining said last one-byte data of said first data set left in said the data register with an odd number of bytes of data of said second data set; and wherein in the data reception mode, said data transfer control means causes said data register to receive an even number of bytes of data in first and second data receptions in units of two bytes, and controls the output of a predetermined number of bytes of data from said data register so that when the predetermined number of bytes of each of said first and second data sets to be output is an odd number, first last one-byte data of said even number of bytes of data is left in said data resister and remaining odd number of bytes of data is output from said data register as said first data set in the first data reception, and so that an odd number of bytes of data is output as said second data set by combining said first last one-byte data left in said data resister with an even number of bytes of data received in a second data reception.

12. A method of transmitting a plurality of data sets including first and second data sets to a data receiptor as a data transmission target each data set including data of a predetermined number of bytes, said method comprising the steps of:

using a data transmission controller including a data register, a transmission interface and a byte counter, said data transmission controller being capable of transmitting data in units of two bytes;

storing data of a data set to be transmitted in the data register;

setting in the byte counter a target count value corresponding to the number of bytes of data to be transmitted from the transmission interface;

determining whether the number of bytes of the data to be transmitted is an odd number;

calculating a first corrected target count value when the number of bytes of the data of the each data set to be transmitted is an odd number, so that last one-byte data that is a remnant for data transmission of said first data set in units of two bytes is not transmitted but left in the data register;

setting the calculated first target count value in the byte counter in place of the currently set target count value;

finishing data transmission of said first data set from the transmission interface when the number of bytes of data that has been transmitted from the transmission interface reaches the first target count value set in the byte counter;

calculating a second corrected target count value so that, in subsequent data transmission for the second data set subsequent to said first data set in units of two bytes, the number of bytes of transmission data becomes an even number by combining said last one-byte data of said first data set left in the data register with an odd number of bytes of data of said second data set;

setting the calculated second target count value in the byte counter in place of the currently set target count value; and finishing data transmission of said second data set from the transmission interface when the number of bytes of data that has been transmitted from the transmission interface reaches the second target count value set in the byte counter.

13. A method of receiving a plurality of data sets including first and second data sets from a data transmitter as a data transmission source, each data set including data of a predetermined number of bytes, said method comprising the steps of:

using a data reception controller including a data register, a reception interface and a byte counter, said data reception controller being capable of receiving data in units of two bytes and connected to a processing unit that uses received data;

setting in the byte counter a target count value corresponding to the number of bytes of data to be received by the data register;

starting first data reception in units of two bytes by the data register via the reception interface;

finishing the data reception of said first data set by the data register when the number of bytes of data that has been received via the reception interface reaches the target count value set in the byte counter, whereby data of an even number of bytes is stored in the data register;

transferring an odd number of bytes of data to said processing unit when a predetermined number of bytes of data set to be output is an odd number so as to leave first last one-byte data of said even number of bytes of data stored in the data register in the first data reception;

in the second data reception, in units of two bytes subsequent to the first data reception, calculating a corrected target count value that is an even number so that a sum in the even number of bytes of data newly taken in by the data register in the second data reception and the last first one-byte data left in the data register becomes equal to an odd number of bytes of data set to be output;

setting the calculated target count value in the byte counter in place of the currently set target count value;

starting second data reception in units of two bytes by the data register via the reception interface; and finishing the data reception of said second data set by the data register when the number of bytes of data that has been received via the reception interface reaches the corrected target count value set in the byte counter.

14. The method according to claim 13 further comprising the steps of:

in the second data reception, when a predetermined number of bytes of a data set to be output is an odd number, causing the data register to receive data of an even number of bytes; and transferring the odd number of bytes of data from the data register to said processing unit so as to leave second last one-byte data of said received even number of bytes of data in said data register.

* * * * *